(12) United States Patent
Miller et al.

(10) Patent No.: US 9,796,322 B1
(45) Date of Patent: Oct. 24, 2017

(54) QUICK CONNECT TIE DOWN SYSTEM

(71) Applicants: Ronald Miller, Culpeper, VA (US);
Addison Scott Karnes, Johnson City, TN (US)

(72) Inventors: Ronald Miller, Culpeper, VA (US);
Addison Scott Karnes, Johnson City, TN (US)

( * ) Notice: Subject to any disclaimer, the term of this patent is extended or adjusted under 35 U.S.C. 154(b) by 0 days.

(21) Appl. No.: 15/394,397

(22) Filed: Dec. 29, 2016

(51) Int. Cl.
*B65D 63/00* (2006.01)
*B60P 7/08* (2006.01)

(52) U.S. Cl.
CPC .................................... *B60P 7/083* (2013.01)

(58) Field of Classification Search
CPC ...... B60N 2/2809; B60P 7/0823; B60P 7/083; B60P 7/0846; Y10T 24/2175; Y10T 24/318; Y10T 24/2187
USPC .................................................. 248/499, 505
See application file for complete search history.

(56) References Cited

U.S. PATENT DOCUMENTS

| | | | | |
|---|---|---|---|---|
| 3,290,010 A * | 12/1966 | Holmes | ................. | B60P 7/0823 24/269 |
| 3,826,473 A * | 7/1974 | Huber | ..................... | B60P 7/083 24/68 CD |
| 4,611,961 A * | 9/1986 | Van Iperen | ............. | B60P 3/075 248/499 |
| 7,240,890 B1 * | 7/2007 | Pellegrino | ................ | B60J 11/00 248/500 |
| 8,459,487 B2 * | 6/2013 | Sharma | ................. | B65F 1/1615 220/315 |
| 8,499,662 B2 * | 8/2013 | Chang | ..................... | B25G 1/04 24/68 CD |
| 8,528,849 B2 * | 9/2013 | Chang | ..................... | B60P 7/083 24/68 CD |
| 8,776,323 B2 * | 7/2014 | McLennan | ............ | B60P 7/0823 24/170 |
| 8,973,884 B1 * | 3/2015 | Stuckey | ............... | B60N 2/2887 24/68 CD |
| 9,162,605 B2 * | 10/2015 | Durand | .................... | B60P 7/083 |
| 9,227,550 B2 * | 1/2016 | Chen | .......................... | B62J 7/08 |
| 9,233,637 B1 * | 1/2016 | Huang | .................... | B60P 7/083 |
| 9,254,779 B2 * | 2/2016 | Kingery | .................. | B60P 7/083 |
| 9,259,828 B2 * | 2/2016 | Bermes | .................... | B25B 25/00 |
| 9,272,886 B2 * | 3/2016 | Kingery | ................... | B66D 3/02 |
| 9,296,330 B2 * | 3/2016 | Diamond | ................ | B60P 7/083 |
| 9,340,145 B2 * | 5/2016 | Yang | ........................ | B60P 7/083 |
| 9,469,239 B2 * | 10/2016 | Armour | .................. | B60P 7/083 |
| 2012/0110801 A1 * | 5/2012 | Joubert | ................. | B60P 7/0846 24/68 CD |
| 2014/0034888 A1 * | 2/2014 | Kingery | .................... | B66D 3/04 254/391 |
| 2014/0183427 A1 * | 7/2014 | Chang | ..................... | B60P 7/083 254/218 |

(Continued)

*Primary Examiner* — Bradley Duckworth
(74) *Attorney, Agent, or Firm* — Richard K Thomson (57) ABSTRACT

A quick-connect tie down system includes a grip base with a separable C-shaped clamping bracket which is interconnected thereto by a durable strap. A ratchet assembly mounted on the grip base winds the strap onto a spool to draw C-shaped clamping bracket toward a second removable connector to sandwich a portion of an article to a portion of a vehicle or secondary article. Use of one quick-connect tie down system at each end of the article ensures its retention to a vehicle or secondary article. Extension straps are provided to afford added flexibility of usage.

11 Claims, 8 Drawing Sheets

(56) References Cited

U.S. PATENT DOCUMENTS

2015/0224912 A1\* 8/2015 Brown .................... B60P 7/083
  242/395
2016/0052442 A1\* 2/2016 Yang ..................... B65B 13/025
  24/68 CD
2016/0347233 A1\* 12/2016 Kingery ................. B60P 7/083

\* cited by examiner

QUICK CONNECT TIE DOWN SYSTEM

BACKGROUND AND SUMMARY OF THE INVENTION

Currently, ladders, as well as other articles, are strapped onto the tops and/or sides of cars and vans using all sorts of jury-rigged systems: rope, bungee cords, virtually anything up to and including duct tape. These attachment systems are largely ineffective rendering the ladder or other article at risk for becoming a projectile which can potentially cause bodily injury, as well as damage property, of the owner of the ladder/item and innocent bystanders or passers-by who have the misfortune to be in range when the ineffective retention system gives way.

The present invention comprises a quick-connect tie down system comprising a) a grip base including i) a first housing member; ii) a linearly reciprocating trigger; iii) a first detachable bracket; b) a ratchet assembly secured to the grip base, the ratchet assembly including a spool; c) a separate C-shaped clamping bracket; d) a strap extending between the ratchet assembly on the grip base and the separate C-shaped clamping bracket; whereby when the linearly reciprocating trigger is actuated, the ratchet assembly coils the strap on the spool allowing at least one object to be secured between the first removable bracket and the separate C-shaped bracket. Preferably, the first bracket is itself a C-shaped clamping bracket. The housing of the base includes a pair of channels in which the linearly reciprocating trigger slides.

The ratchet assembly includes the spool, at least one ratchet gear having teeth, a spring-biased retention finger engaging the teeth of the ratchet gear, and an actuator arm with a toothed finger for engaging the teeth of the ratchet gear, the actuator arm being formed on one end of the linearly reciprocating trigger. More preferably, the at least one ratchet gear comprises a pair of ratchet gears, one of the pair of ratchet gears affixed to each end of the spool. The spring-biased retention finger or brake can be retracted against a pressure provided by a spring to permit free rotation of the spool. The first bracket may further include article-engaging hooks at a distal end thereof. The first bracket is a separate element interconnected to a portion of the ratchet assembly by a second length of strap. While the first and second straps are preferably a woven textile, for less demanding applications, both straps may be stretchable elastic straps to facilitate attaching items including bundles, and the like.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
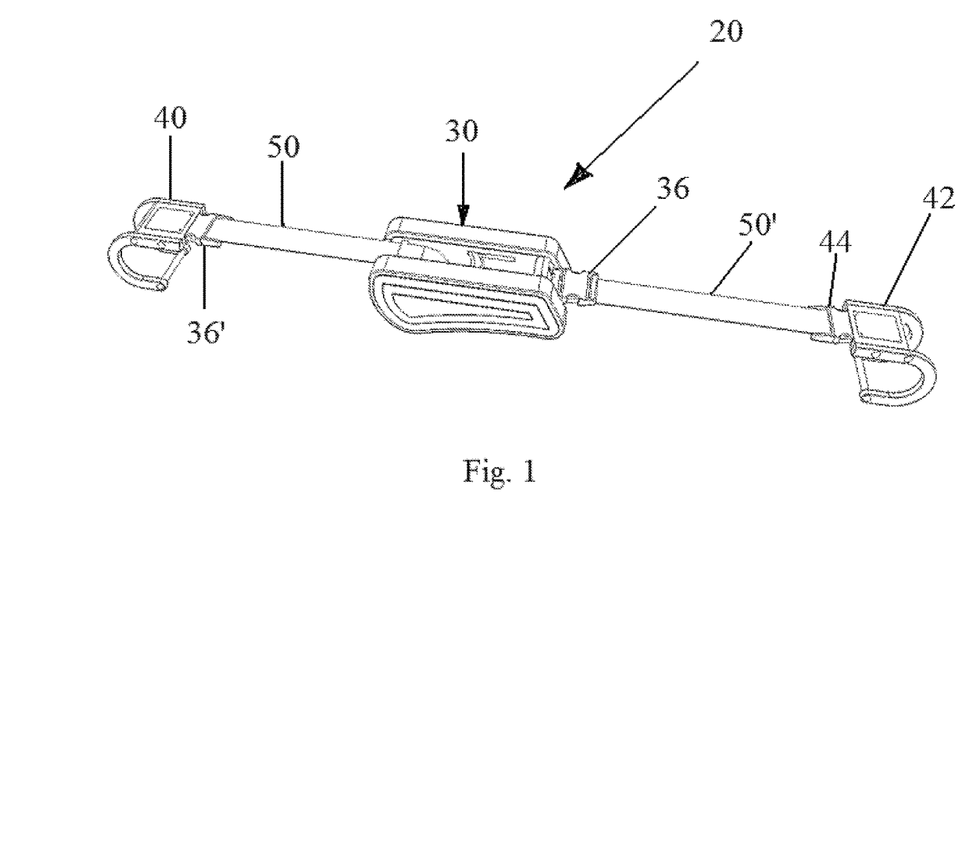
FIG. 1 is a left side perspective view of a first embodiment of the quick connect tie down system of the present invention.
Figure 2:
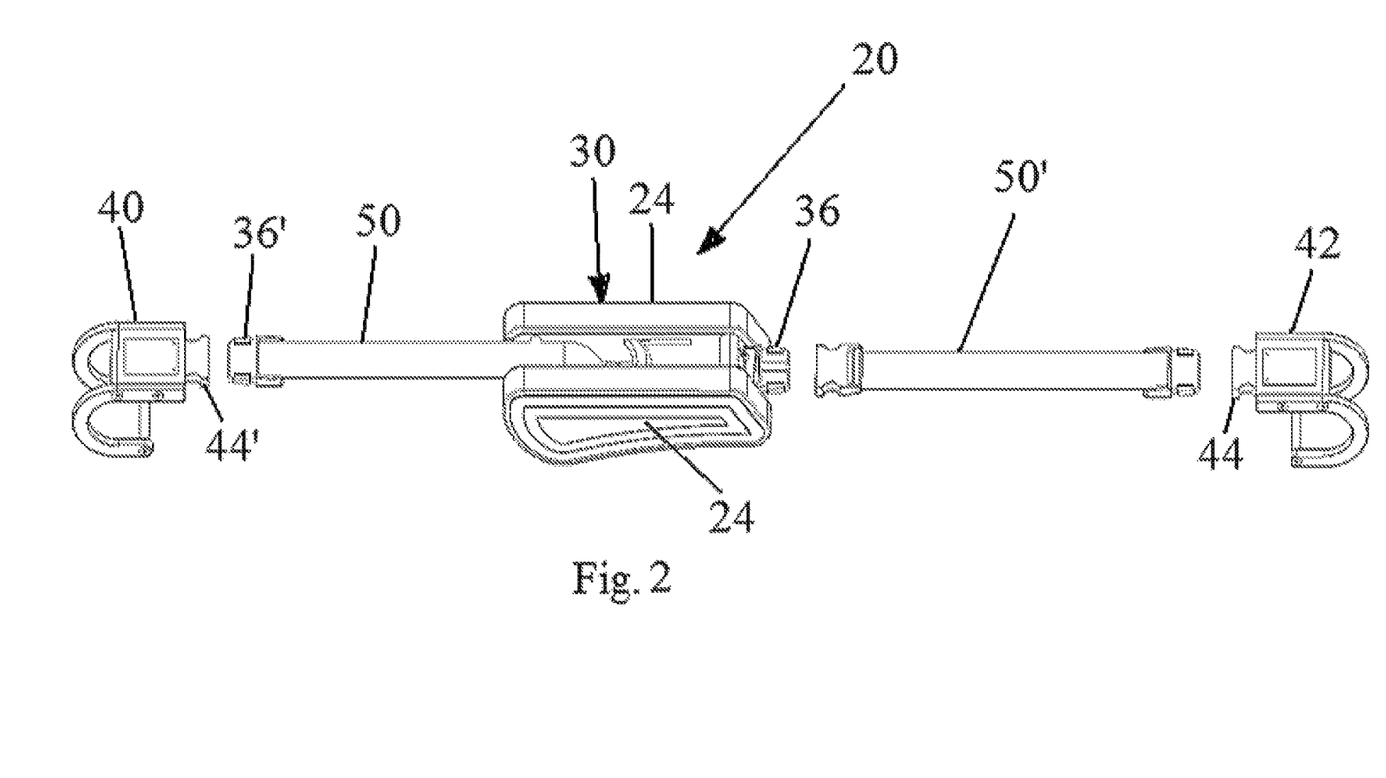
FIG. 2 is an exploded left side perspective view of a variation of the first embodiment.
Figure 3:
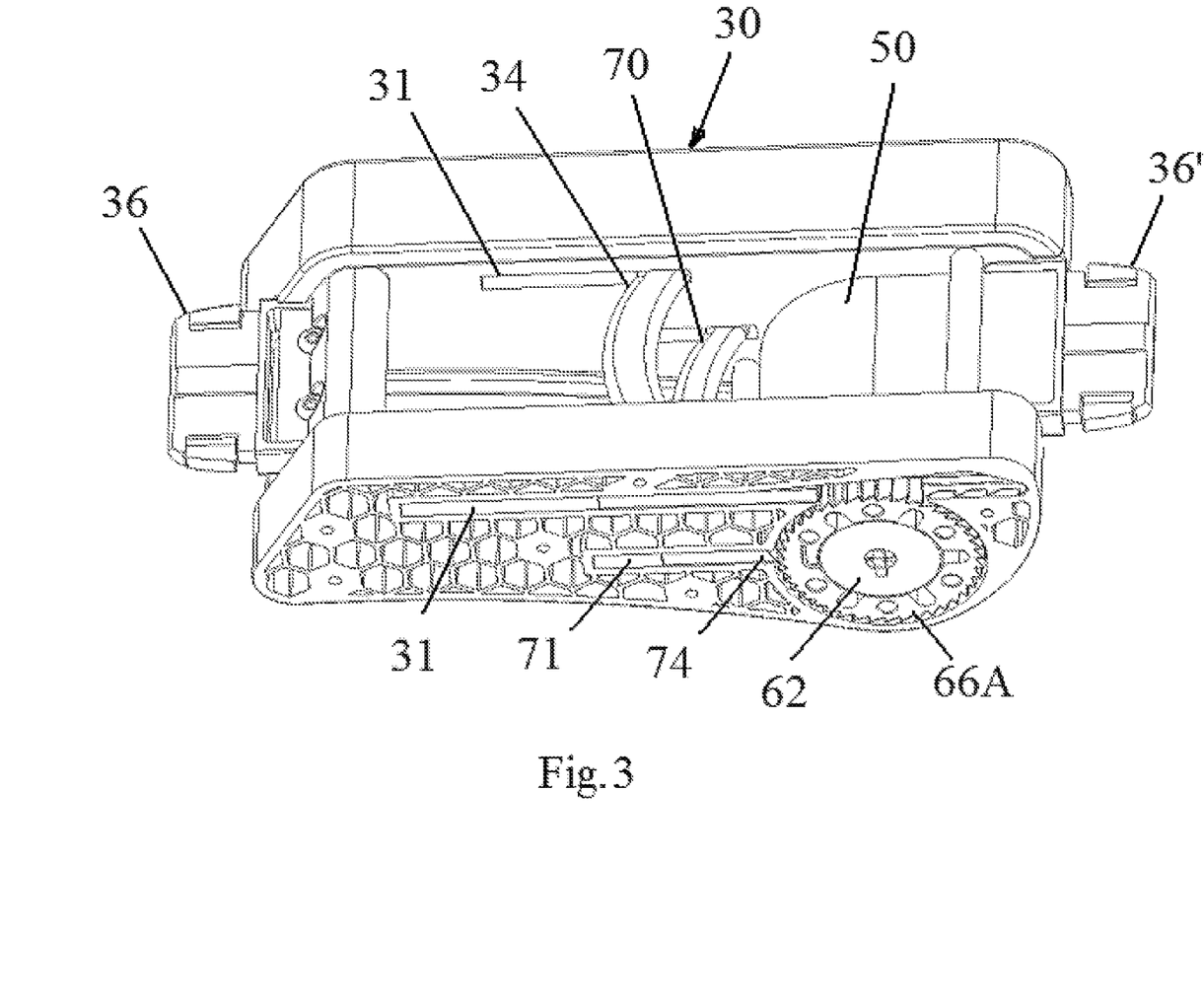
FIG. 3 is a right side perspective view of the grip base of the first embodiment with the side panel removed.
Figure 4A:
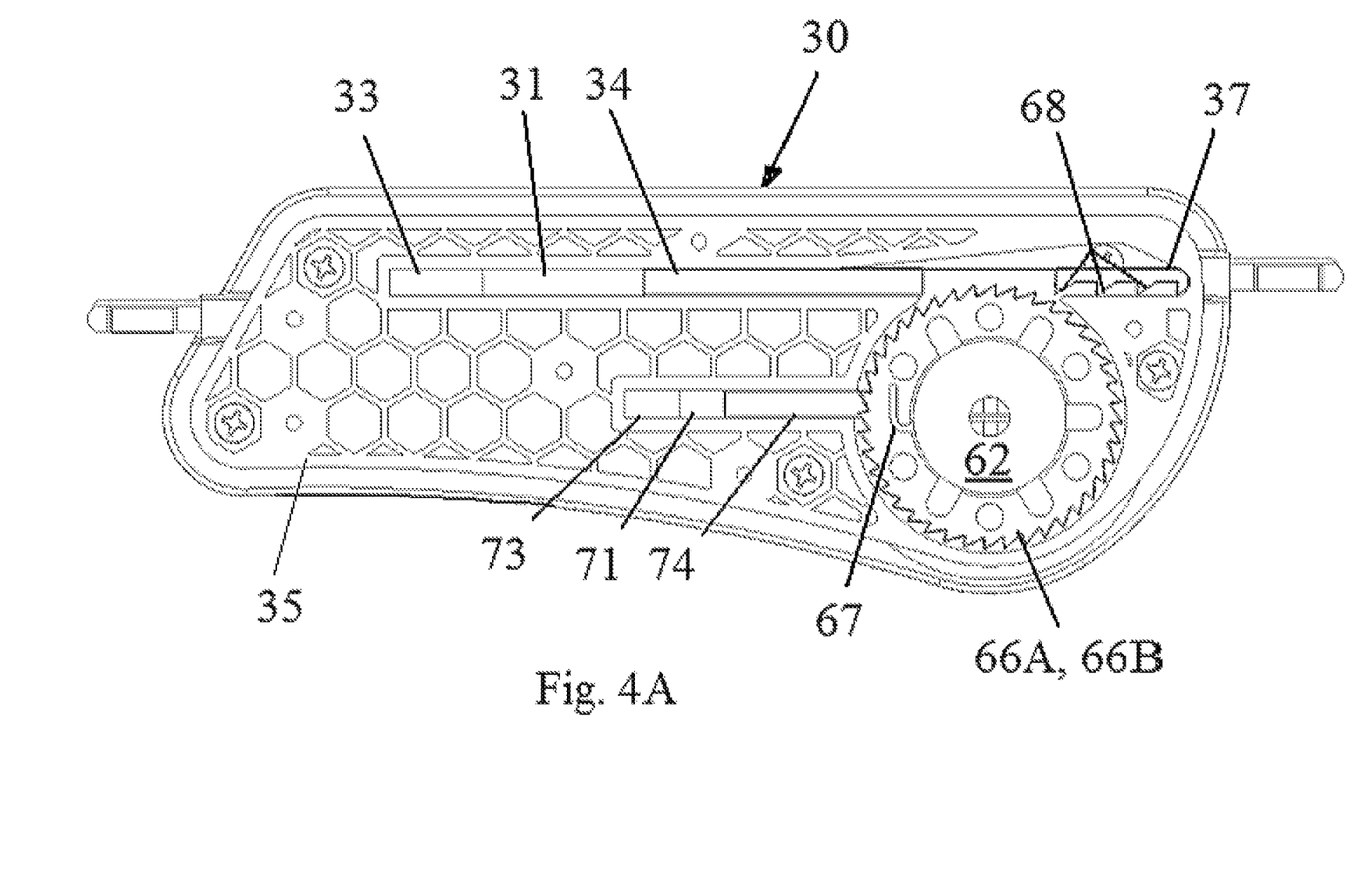
FIG. 4A is a right side view of the first embodiment with reciprocating trigger in an extended position.
Figure 4B:
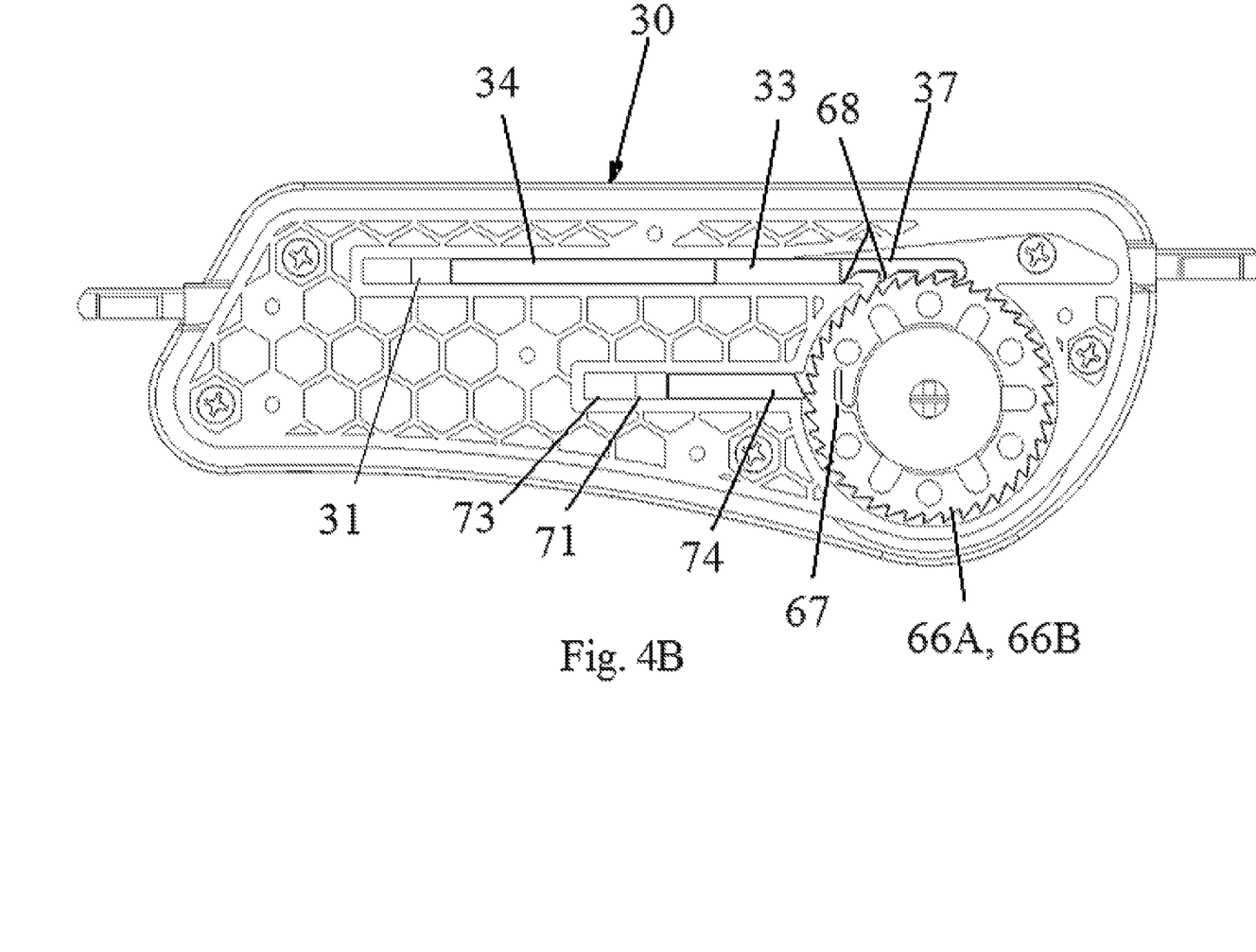
FIG. 4B is a right side view of the first embodiment with the reciprocating trigger in a retracted position.
Figure 5:
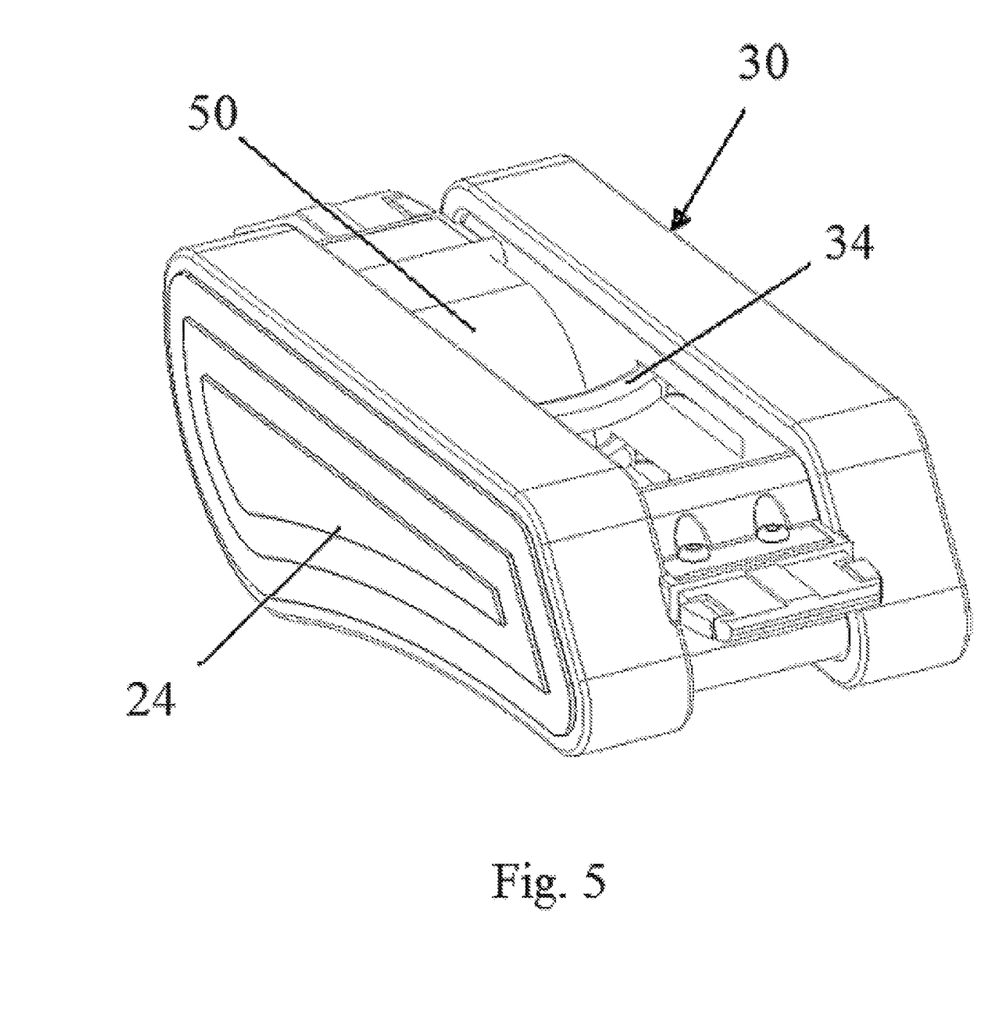
FIG. 5 is a rear perspective view of grip base of the present invention.

A first embodiment of the quick-connect tie down system of the present invention is depicted in FIGS. 1, 2, 5 generally at 20. Quick-connect tie down system 20 comprises a grip base 30 and an C-shaped clamping bracket 40 interconnected to the grip base 30 by strap 50. Straps 50, 50' are preferably made of a durable woven polyester fabric of the type used for seat belts and shoulder straps on backpacks, luggage, cameras, and the like. Alternatively, one or both of the straps may be made of a stretchable elastic band. Such an alternative would only be suitable for a light-duty application and is not recommended nor appropriate for use with ladders. Further, it is understood that in FIG. 2, the strap 50' is optional and may be omitted by simply connecting female receptacle 44 directly to side-release clip 36.

Figure 6A:
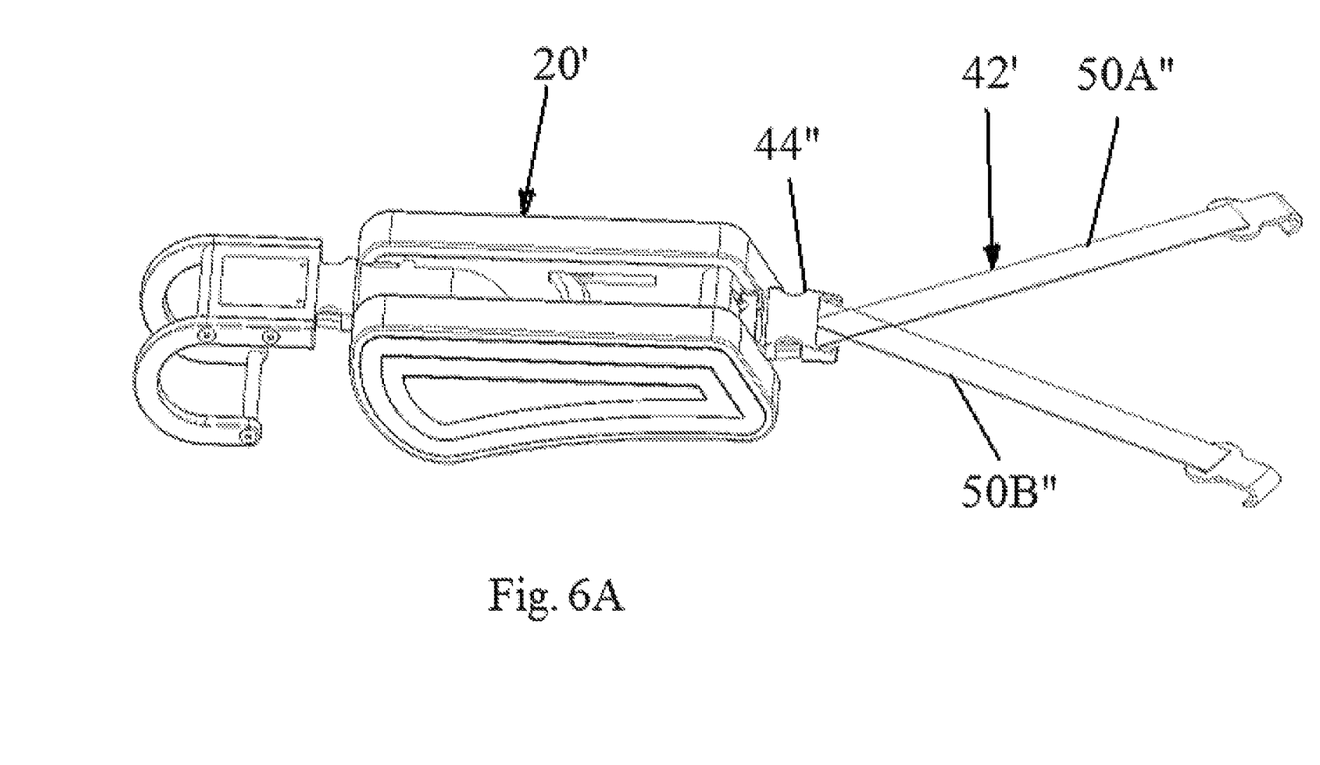
FIG. 6A is a front perspective view of a second embodiment depicting a first alternative detachable connector; and, FIG. 6B is a front perspective view of a third embodiment depicting a second alternative detachable connector.
Figure 6B:
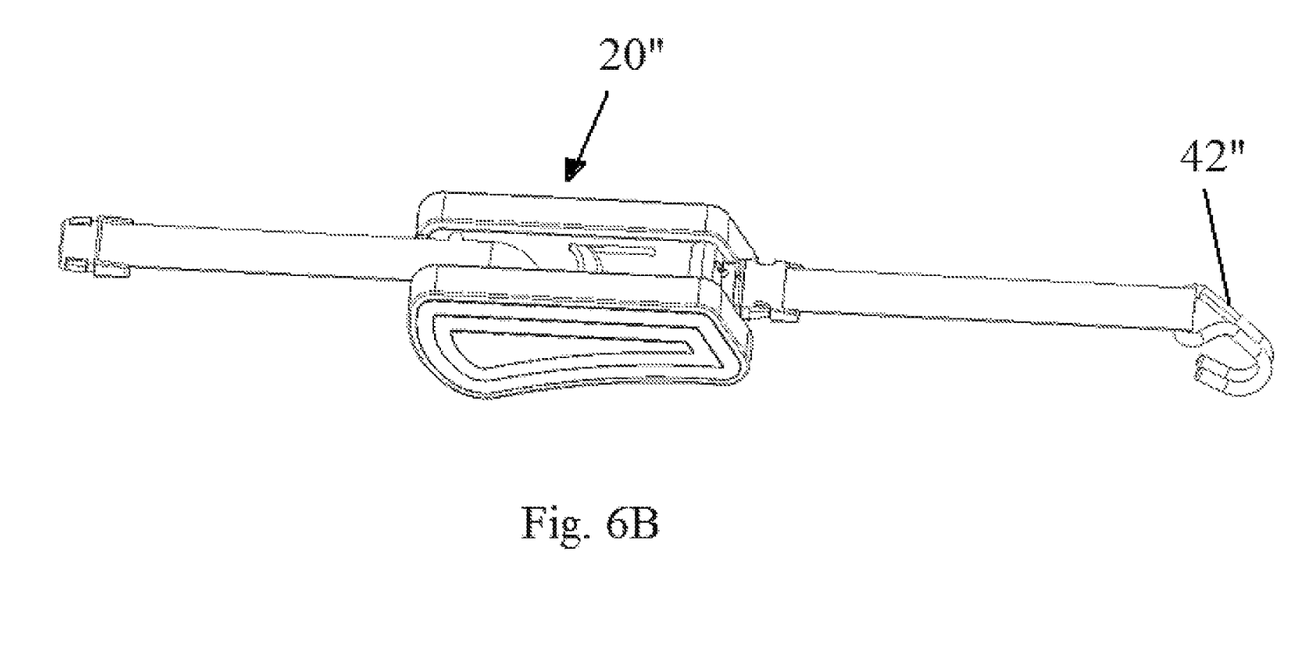

Grip base 30 includes i) a housing 32; ii) a linearly reciprocating trigger 34; and iii) a first dual spring-biased, side-release clip 36. Side release clip 36 allows for attachment of any of a number of variously configured detachable connectors 42 (FIGS. 2, 6A, 6B). Detachable connector 42 cooperates with C-shaped clamping bracket 40 to clamp at least one item there between. Side-release clip 36 can connect detachable connector 42 directly to housing 32 via female receptacle 44 on connector 42 or by means of an intermediate length of strap 50' of whatever length desired (FIG. 2) using an additional side release clip. More preferably, clamping bracket 40 and connector 42 will serve to clamp the stanchion or rung of a ladder (not shown) to a luggage rack or gunnel of a truck, van or car. Most preferably, at least two quick-connect tie down systems 20 will be used, one to secure each end of a ladder to the vehicle transporting it. It is preferred that the strap 50 be extended across a ladder rung and allowed to extend vertically to where C-shaped clamping bracket 40 engages luggage rack so as not to pull laterally on luggage rack and to more securely fasten the ladder in place. C-shaped clamping bracket 40 is secured to strap 50 by a second dual spring-biased, side-release clip 36'.

Quick-connect tie down system 20 is depicted in FIG. 3, 4A-C with side panels 24 removed in order to show additional detail. It will be understood that these panels will not be readily removable and will generally be affixed by screws or adhesives. Housing 32 has two honey-comb sidewalls 35, the honey-comb structure affording light-weight structural strength. Trigger 34 slides in inward portions of channels 33 in sidewalls 35 of housing 32 (FIG. 3, 4A-C). Springs 31 bias trigger 34 to a first extended position (to the right in FIGS. 3, 4A-4C). Springs 31 are depicted as leaf springs but could be of alternate type, such as coil springs, as well. Ratchet assembly 60 comprises spool 62, a pair of ratchet gears 66A and 66B secured to each end of spool 62, retention finger 74 forming a ratchet brake, and retention arm 70. Ratchet spool 62 may have a slot (not shown) for receiving a first proximate end of strap 50 and/or may alternatively be secured to spool 62 by stapling, adhesive, or stitching. A pair of power springs 67 are associated with ratchet gears 66A and 66B. Power springs 67 are equal force springs, i.e., the provide the same retraction force when the strap is extended 10 feet as when it is extended 2 inches. Retention arm 70 retention fingers 74 which form ratchet brakes slide in inner portions of channels 73. When retention fingers forming ratchet brakes 74 are disengaged from the teeth of ratchet gears 66A and 66B, power springs 67 auto-retract the strap 50. Distal end 54 of strap 50 is woven through at least an opening in side-release clip 36' to secure strap 50 to clip 36'. Trigger 34 is biased by springs 31 to a return or at-rest position. Gear-engaging teeth 68 (FIG. 2C) on trigger 34 mesh with teeth 67 of ratchet gears 66A, 66B.

Preferably, actuator arms 37 form integral portions of trigger 34, one arm 37 engaging each of ratchet gears 66A, 66B. Retention fingers 74 forming ratchet brakes or retention arm 70 are biased into contact with ratchet gears 66A, 66B by springs 71. Repeatedly compressing trigger 34 against the biasing springs 31 causes teeth 68 to rotate the ratchet gears 66A, 66B in a counterclockwise (FIG. 1A) direction winding the strap 50 onto spool 62 drawing connector 42 toward C-shaped bracket 40 to sandwich a ladder leg and roof-rack component there between. Teeth 68 slide freely over ratchet gear 66A, 66B on its return trip as impelled by spring 31. To release tension on the strap 50, retention finger/ratchet brake 74 is pulled against the force of springs 71 to disconnect with gears 66A, 66B allowing free-wheeling of spool 62 such that C-shaped bracket 40 may be pulled uncoiling strap 50 from spool 62. It should be noted that the springs in the system in conjunction with a small amount of "stretchiness" in the strap 50, provide the quick-connect tie down system 20 of the present invention with what amounts to "spring-loading" of connector 42.

In use, connector 42 is hooked onto the roof rack of a vehicle. The user then engages C-shaped bracket 40 with her/his thumb, grasps retention arm 70 collapsing spring 71 permitting spool 62 to free wheel and enough strap 50 to reel off as needed to hook pivoting C-shaped bracket 40 onto ladder a rung. Then, switching her/his finger grip from retention arm 70 to linearly reciprocating trigger 34, the user repeatedly collapses trigger 34 against the pressure of springs 31 actuating teeth 68 to rotate ratchet gears 66A, 66B coiling strap 50 onto spool 62 until the ladder is secured to the roof rack.

A second embodiment is depicted in FIG. 6A generally at 20'. In this embodiment the female receptacle 44' of connector 42' has a pair of orthogonally oriented straps 50A" and 50B". This provides added flexibility in the capabilities of the quick-connect tie down system 20 of the present invention. A third embodiment of the quick-connect tie down system is depicted in FIG. 6B generally at 20". In this embodiment the connector is configured as a pair of hooks 42". It will be appreciated that the actual connector 42 may take any form desired to facilitate the attachment of whatever object needs connecting in whatever manner to whatever second object.

Various changes, alternatives, and modifications will become apparent to a person of ordinary skill in the art after a reading of the foregoing specification. For example, it will be apparent that use in attaching a ladder to a roof rack of a vehicle is but one of a myriad of potential uses for the versatile tie down system of the present invention. It is intended that all such changes, alternatives, and modifications as fall within the scope of the appended claims be considered part of the present invention.

We claim:

1. A quick-connect tie down system comprising
   a) a grip base including
      i) a housing member;
      ii) a linearly reciprocating trigger;
      iii) a ratchet assembly secured to said grip base, said ratchet assembly including a spool;
   b) a first clamping bracket associated with said grip base;
   c) a second detachable connector associated with said grip base;
   d) a first strap extending between said spool of said ratchet assembly on said grip base and said second detachable connector bracket;
   e) a second strap extending between said first clamping bracket and said grip base;
   whereby when said linearly reciprocating trigger is actuated, said ratchet assembly coils said first strap on said spool allowing at least one object to be secured between said first clamping bracket and said separate detachable connector.

2. The quick-connect tie down system of claim 1 wherein said first clamping bracket is a C-shaped clamping bracket.

3. The quick-connect tie down system of claim 1 further comprising a pair of inwardly directed channels in said grip base in which said linearly reciprocating trigger slides.

4. The quick-connect tie down system of claim 1 wherein said ratchet assembly comprises said spool, at least one ratchet gear having teeth, a spring-biased retention finger engaging said teeth of said ratchet gear, and an actuator arm with a toothed finger for engaging said teeth of said ratchet gear, said actuator arm being formed on one end of said linearly reciprocating trigger.

5. The quick-connect tie down system of claim 4 wherein said ratchet assembly comprises a pair of ratchet gears, one of said pair of ratchet gears affixed to each end of said spool.

6. The quick-connect tie down system of claim 5 further comprising a pair of power springs associated with said spool of said ratchet assembly, a brake means formed by said retention finger engaging teeth on said pair of ratchet gears for restricting movement of said ratchet assembly, whereby when said brake means is disengaged, said pair of power springs auto-retracts said first strap.

7. The quick-connect tie down system of claim 4 wherein said spring-biased retention finger can be retracted against a pressure provided by a biasing spring to permit free rotation of said spool.

8. The quick-connect tie down system of claim 1 wherein said second connector further comprises article-engaging hooks at a distal end thereof.

9. The quick-connect tie down system of claim 1 at least one of said first and second straps being removable from said base.

10. The quick-connect tie down system of claim 9 wherein both of said first and second straps are removable from said base.

11. The quick-connect tie down system of claim 10 wherein a series of side-release connectors having male and female ends comprise means by which said first and second straps are removable and allow additional auxiliary straps to provide added length and flexibility to said quick-connect tie down system.

* * * * *